(12) United States Patent
Marioni

(10) Patent No.: US 6,724,111 B2
(45) Date of Patent: Apr. 20, 2004

(54) ANTI-CONDENSATION DEVICE PARTICULARLY FOR ELECTRIC MOTORS

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 0 days.

(21) Appl. No.: 10/289,323

(22) Filed: Nov. 7, 2002

(65) Prior Publication Data

US 2003/0102740 A1 Jun. 5, 2003

(30) Foreign Application Priority Data

Nov. 27, 2001 (IT) ..................................... PD2001A0277

(51) Int. Cl.[7] ................................................. H02K 5/10
(52) U.S. Cl. ......................................... 310/88; 310/89
(58) Field of Search .............................. 310/89, 88, 85; 417/902, 423.14, 424.1

(56) References Cited

U.S. PATENT DOCUMENTS 3,308,317 A  3/1967  Allenbaugh ................. 310/88
4,544,166 A  10/1985  Karasawa .................... 310/88

FOREIGN PATENT DOCUMENTS

| DE | 26 17 860 | 11/1977 | ............ H02K/9/02 |
| DE | 43 30 648 | 3/1995 | ............ H02K/9/04 |
| FR | 2 750 810 | 1/1998 | |

*Primary Examiner*—Burton Mullins
(74) *Attorney, Agent, or Firm*—Akerman Senterfitt

(57) ABSTRACT

An anticondensation device particularly for electric motors, comprising a box-like body that contains the stator windings inside which the enclosure for a rotor is arranged hermetically, a cover to be fixed over the bottom of the box-like body, spaced therefrom, to define an interspace and a perimetric air passage gap. The bottom has through holes, and corresponding first collars protrude perimetrically to the holes toward the cover and enter with play second collars that protrude from the cover toward the bottom. An air passage pathway is formed between the first and second collars. The box-like body is arranged in functional configuration with its bottom substantially vertical.

10 Claims, 2 Drawing Sheets

US 6,724,111 B2

ANTI-CONDENSATION DEVICE PARTICULARLY FOR ELECTRIC MOTORS

BACKGROUND OF THE INVENTION

The present invention relates to an anticondensation device particularly for electric motors.

As is known, a type of electric motor, for example a motor used in circulating pumps of heating systems, comprises a submerged rotor that is arranged within a corresponding enclosure arranged in turn inside stator windings contained in a box-like body.

The enclosure of the rotor is hermetic, so as to avoid infiltrations of the working fluid into the chamber formed by the box-like body that contains the stator windings, which must remain isolated.

Nevertheless, in normal operating conditions, owing to the difference in temperature between the inside of the box-like body, whose temperature is determined by the highest among the temperatures of the stator windings and of the working fluid, and the outside environment, any moisture of the air that is present inside said box-like body condenses at its inner wall.

In the worst case, this condensation causes problems in terms of reduction and/or lack of insulation between the phases of the stator windings and/or with respect to the ground connection, causing malfunctions.

An even worse problem arises if an electronic board is provided inside the motor for controlling its operation; such a board would inevitably be affected by the presence of internal condensate or water.

In order to obviate the problem of condensation formation inside the box-like body that contains the stator windings, drain openings are provided on its portion designed to be arranged at the lowest level and should allow the discharge of the condensation by gravity.

Furthermore, if the motor has an electronic control board, the container of such board, if provided, also has condensation drain openings at its portion bound to be arranged at the lowest level.

These openings must be sized and arranged in positions that ensure protection against water splashes, as prescribed by the EN 60259 standards related to the degrees of protection of enclosures, and in many cases installation positions of the motor itself are prohibited.

This solution, in any case, does not solve the problem of condensation formation, since the drain openings are indeed intended solely to discharge any condensation that has already formed inside the box-like body.

Another known constructive solution is to provide, over appropriate holes provided in the box-like body that contains the stator windings and/or the electronic board, a porous membrane that is permeable to water vapor and impermeable to water.

In this manner, ventilation is allowed inside the box-like body, allowing therefore the flow of warm air from the inside toward the outside of the box-like body, preventing formation of condensation.

However, this constructive solution is particularly complicated from the constructive standpoint and is expensive, because it is necessary to arranged the porous membrane over the holes of the box-like body.

SUMMARY OF THE INVENTION

The aim of the present invention is to solve or substantially reduce the problems of known types of anticondensation devices particularly for electric motors.

Within this aim, an object is to provide an anticondensation device that allows effective ventilation inside the box-like body that contains the stator windings.

Another object is to provide an anticondensation device that has a simple structure.

Another object is to provide an anticondensation device that also protects the motor against the infiltration of water splashes, as prescribed by the EN 60529 standards related to the degrees of protection of enclosures.

Another object is to provide an anticondensation device that can be assembled easily.

Another object is to provide an anticondensation device that has a low cost.

This aim and these and other objects that will become better apparent hereinafter are achieved by an anticondensation device particularly for electric motors, of the types that comprise a box-like body that contains the stator windings inside which the enclosure for a rotor is arranged hermetically, characterized in that it comprises a cover to be fixed over the bottom of said box-like body, so as to be spaced therefrom, in order to form an interspace and a perimetric air passage gap, said bottom being provided with through holes, corresponding first collars protruding perimetrically to said holes toward said cover and entering with play second collars that protrude from said cover toward the bottom, an air passage pathway being formed between said first and second collars, said box-like body being designed to be arranged in the functional configuration so that its bottom is substantially vertical.

BRIEF DESCRIPTION OF THE DRAWINGS

Further characteristics and advantages of the invention will become better apparent from the description of a preferred but not exclusive embodiment thereof, illustrated only by way of non-limitative example in the accompanying drawings, wherein.

DESCRIPTION OF THE PREFERRED EMBODIMENTS

Figure 1:
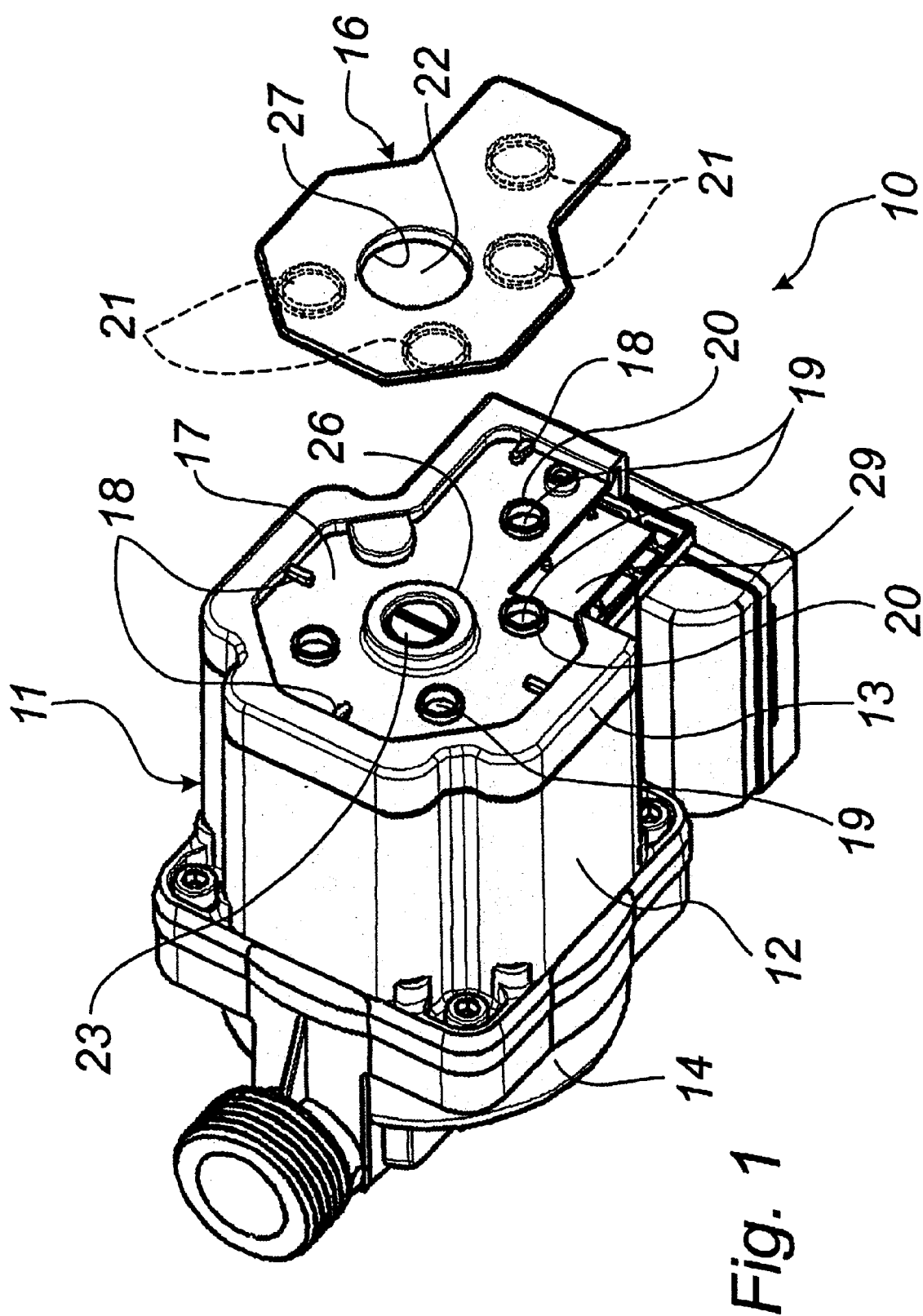
FIG. 1 is an exploded view of an anticondensation device particularly for electric motors, according to the invention.
Figure 2:
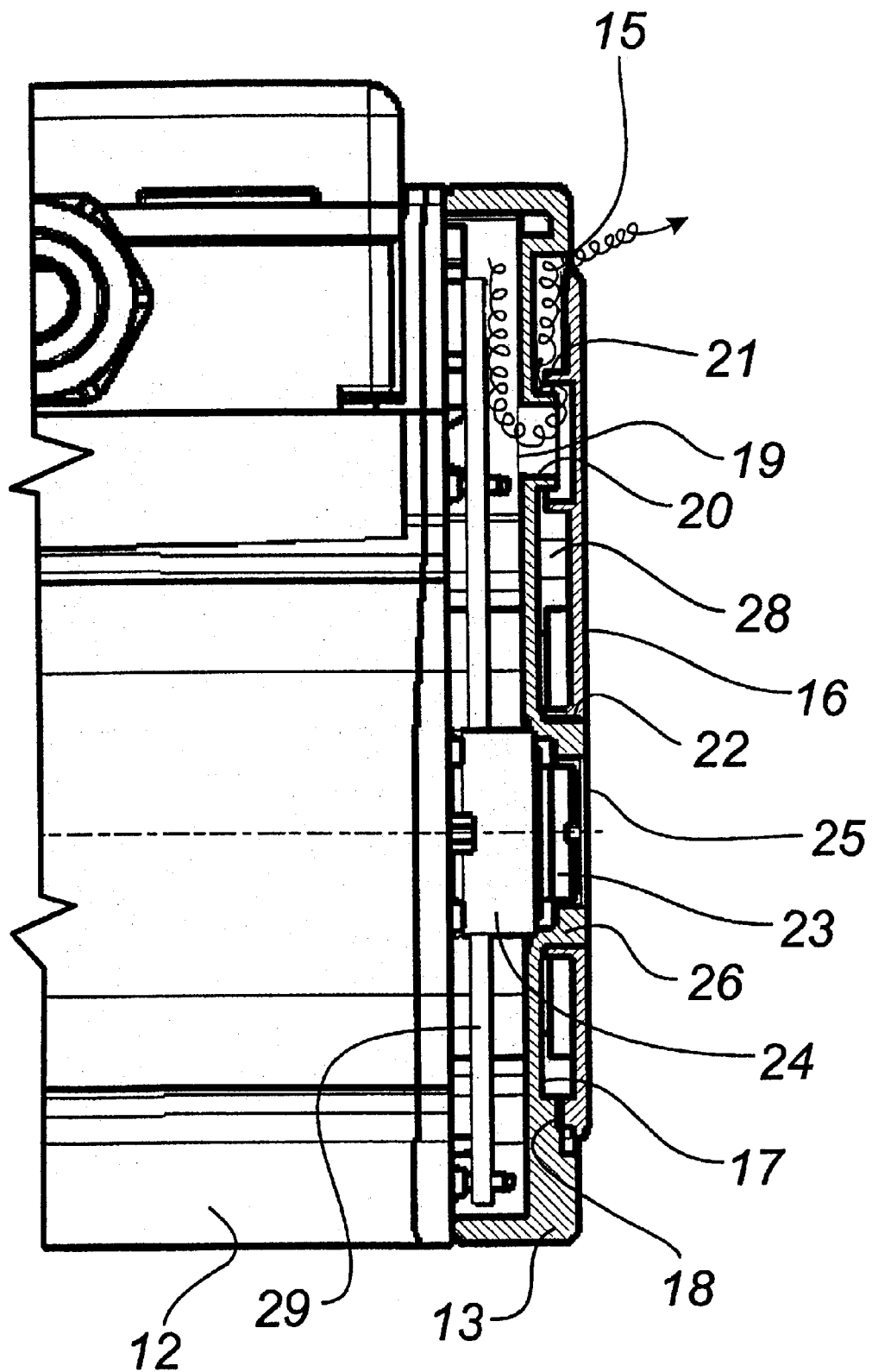
FIG. 2 is a transverse sectional view of a portion of the device of FIG. 1, in the assembled condition.

With reference to the figures, an anticondensation device particularly for electric motors, according to the invention, is generally designated by the reference numeral 10.

The device 10 is to be associated with an electric motor, generally designated by the reference numeral 11, that comprises a box-like body 12 in which the electric components, such as stator windings and rotor. For the sake of simplicity it is shown the enclosure of the rotor 24 and an electronic control board 29 for their operation.

The box-like body 12 is coupled to a bottom 13 on one side and to a head 14 on the other side; said head, in this case, forms the volute of a centrifugal pump, and said bottom and said head are arranged vertically when the pump is in the operating position.

The device 10 comprises a cover 16, which is designed to be fixed over the bottom 13 and spaced from it, so as to form an interspace 28 and a perimetric gap 15 that allows the passage of air.

The bottom 13 is provided with a recess 17 that is substantially flat and shaped complementarily to the cover 16 and is larger than said cover, so as to define the perimetric gap 15 that is planar, i.e. lies on a plane when said cover 16 is arranged within its dimensions.

Tabs 18 protrude perimetrically with respect to the recess 17, and the cover 16 is designed to be fixed onto said tabs, for example by ultrasonic welding or gluing, on corresponding perimetric portions of said cover, so as to keep said cover spaced from the bottom 13.

The cover 16 is substantially plate-like and flat, with a contoured edge.

The bottom 13, at the recess 17, is provided with a plurality of circular through holes 19, perimetrically to which first collars 20 protrude toward the cover 16; said first collars enter with play corresponding second collars 21, which protrude from the cover 16 toward the bottom 13.

The first collars 20 have a circular cross-section and are arranged coaxially to the second collars 21, which also have a circular cross-section.

In particular, the first and second collars 20 and 21 have such an axial extension that their free ends are spaced respectively from the cover 16 and from the bottom 13, so as to allow the passage of air.

The cover 16 also has a central through hole 22, which allows access to an openable plug 23 that is arranged on the lower end of the enclosure 24 of the rotor and protrudes from the bottom 13 of the box-like body 12 at an opening 25 thereof.

A connector 26 protrudes from the opening 25, and the lower end of said enclosure 24 is inserted hermetically therein and enters, with its end portion and with minimal play, the inner lip 27 of the through hole 22.

As regards operation, it is evident that the device 10 has a structure such as to provide a labyrinth formed by the perimetric gap 15, the interspace 28 and the first and second collars 20 and 21 which allows the circulation of air between the inside and the outside of the box-like body 12.

The device 10 is such that it avoids formation of condensation, allowing a continuous exchange of the air inside the box-like body 12, also due to the fact that the possibly moist warm air tends to exit naturally from the box-like body 12 due to a convection effect, carrying away the moisture.

Moreover, the cover 16 and the labyrinth formed prevent the penetration of any water splashed from outside into the box-like body 12, as prescribed by the EN 60529 standard related to the degrees of protection of enclosures, protecting the electrical components and the electronic board 29.

In practice it has been found that the present invention has achieved the intended aim and objects.

The through holes in fact allow a continuous exchange of air between the inside and the outside of the box-like body, facilitating on the one hand a reduction in the difference in temperature between the electric motor and the outside environment and on the other hand a removal of the moisture that is present inside said motor, avoiding formation of condensation.

A ventilation of this type is very useful possibly also for cooling the components of the electronic board that controls the operation of the electric motor.

In practice, the device according to the invention does not eliminate the water formed by condensation but prevents formation of said condensation.

The present invention is susceptible of numerous modifications and variations, all of which are within the scope of the appended claims.

The technical details may be replaced with other technically equivalent elements.

The materials, so long as they are compatible with the contingent use, as well as the dimensions, may be any according to requirements.

The disclosures in Italian Patent Application No. PD2001A000277 from which this application claims priority are incorporated herein by reference.

What is claimed is:

1. An anti-condensation device for electric motors, of a type that comprises a box-like body having a bottom and containing stator windings with a rotor enclosure arranged hermetically therein, the device comprising:

a cover which is fixed over the bottom of said box-like body, so as to form an interspace and a perimetric air passage gap;

through holes provided at said bottom;

corresponding first collars protruding from said bottom perimetrically about said holes toward said cover; and second cellars that protrude from said cover toward the bottom;

said first collars being shaped so as to enter said second collars and create a gap between said first and second collars when said cover is fixed over said box-like body; and an air passage pathway formed between said first and second collars, wherein said box-like body is arranged when in an operating position with said bottom oriented parallel to a vertical axis.

2. The device of claim 1, wherein said bottom is provided with a recess that is shaped substantially complementarily to said cover, said recess having an extension that is larger than an extension of said cover, to form, with said cover fixed thereon, said perimetric air passage gap, said perimetric air gap being substantially planar.

3. The device according to claim 2, comprising a plurality of tabs located around the perimeter of the device that protrude from said bottom to said recess in an upward region thereof, said cover being fixed to said tabs at corresponding perimetric portions thereof, so as to stand spaced from said bottom to form said air passage gap.

4. The device of claim 3, wherein said first and second collars comprise free ends which are spaced from said recess of the bottom and from said cover, respectively.

5. The device of claim 4, wherein said first and second collars are arranged to form a labyrinth-like path that allows passage of air while preventing water splashes from entering under said cover.

6. The device of claim 4, wherein said through holes are circular.

7. The device of claim 6, wherein said first end second collars have circular cross-sections, said first collars being arranged coaxially to said second collars.

8. The device of claim 7, wherein said cover is substantially plate like and flat, with a contoured edge.

9. The device of claim 8, wherein said rotor enclosure is provided with an openable plug arranged on a lower end thereof so as to protrude through an opening in the bottom of said box-like body, said cover having a central through hole that allows access to said openable plug.

10. The device of claim 9, further comprising a connector that protrudes from said opening in the bottom, the lower end of said rotor enclosure being accommodated hermetically in said connector, an end portion of said connector entering said central through hole of the cover with minimal play between said connector end portion and an inner lip of said through hole.

* * * * *